United States Patent [19]
Goda

[11] Patent Number: 6,089,619
[45] Date of Patent: Jul. 18, 2000

[54] LOCKING CAM-TYPE COUPLING

[75] Inventor: Michael A. Goda, Fontanet, Ind.

[73] Assignee: Green Leaf, Inc., Fontanet, Ind.

[21] Appl. No.: 08/895,849

[22] Filed: Jul. 17, 1997

[51] Int. Cl.[7] .................................................. F16L 37/00
[52] U.S. Cl. .............................. 285/312; 285/81; 285/85
[58] Field of Search .................................. 285/84, 85, 91, 285/311, 312, 81; 74/527

[56] References Cited

U.S. PATENT DOCUMENTS

| | | | |
|---|---|---|---|
| 2,164,512 | 7/1939 | Furlong | 74/527 |
| 4,113,227 | 9/1978 | Cigliano | 285/84 |
| 4,691,942 | 9/1987 | Ford | 285/84 |
| 4,802,694 | 2/1989 | Vargo | 285/312 |
| 5,338,069 | 8/1994 | McCarthy | 285/312 |
| 5,435,604 | 7/1995 | Chen | 285/84 |

Primary Examiner—Brian K. Green
Assistant Examiner—Marcus Dolce
Attorney, Agent, or Firm—H. John Barnett

[57] ABSTRACT

A locking cam-type coupling for rapidly coupling two pipe sections together. A spring-biased lock pin is provided for each cam lever arm that has a positive locking action when the cam lever arm is moved to the closed position. Each cam lever arm is grooved to allow the spring-biased lock pin to contact the cam lever arm and control its position. The lock pin has two different diameters, one for locking the fitting to the complementary part of the pipe coupling to couple the pipe sections together, and a second, open position so the pipe sections can be released and decoupled.

4 Claims, 4 Drawing Sheets

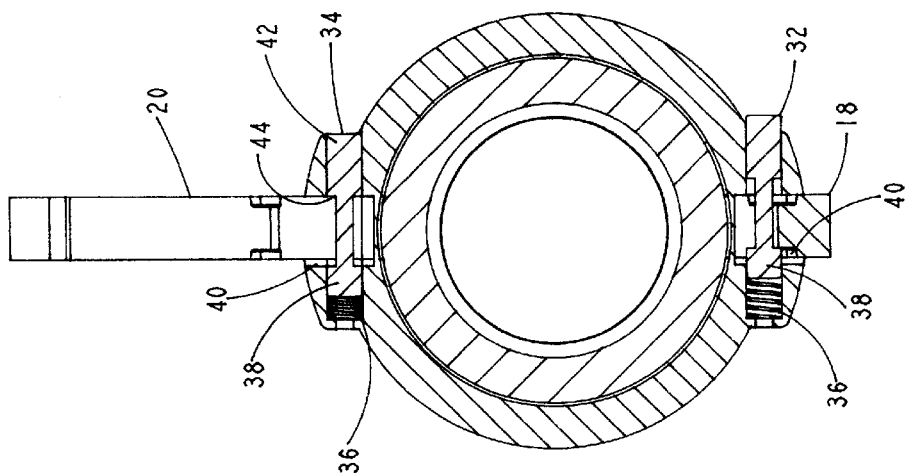
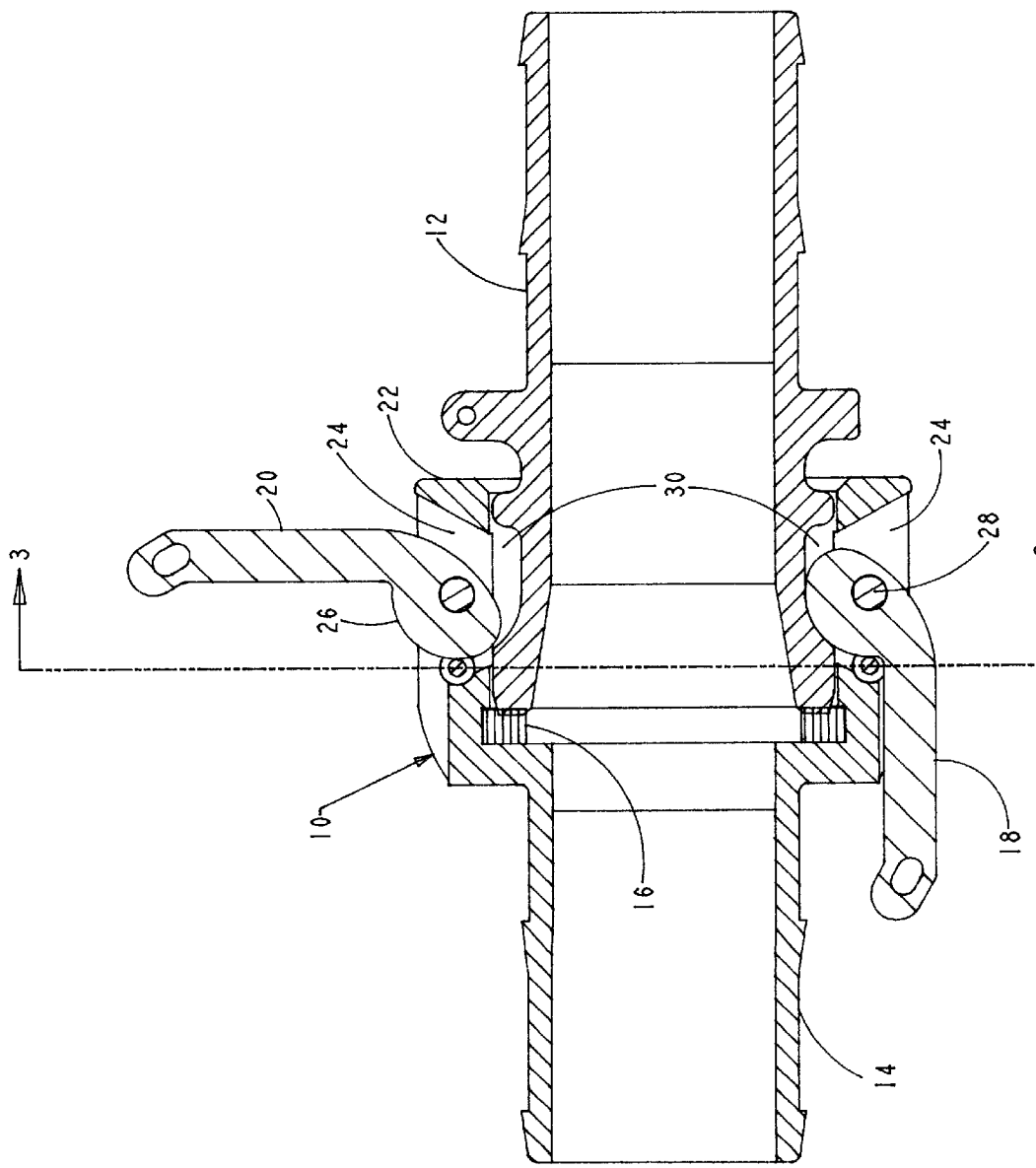

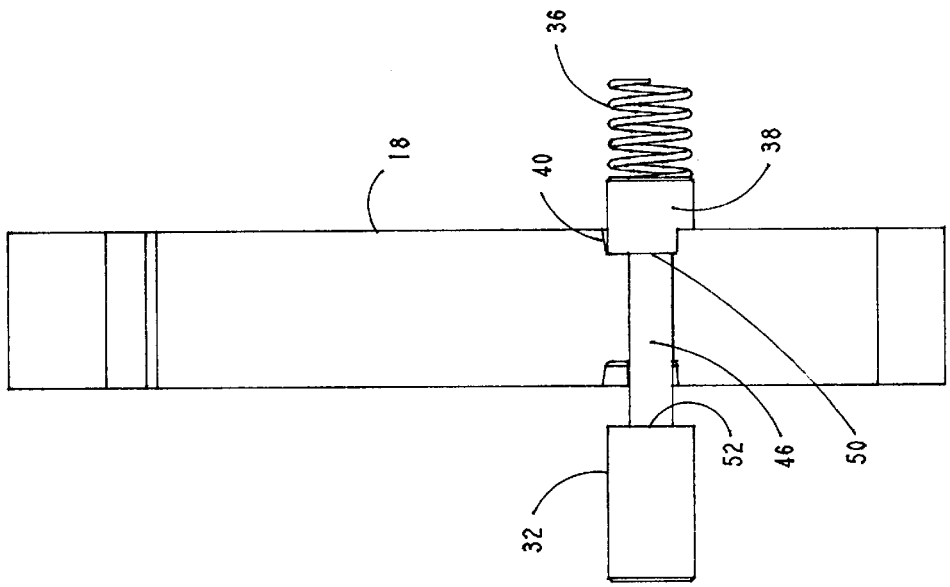
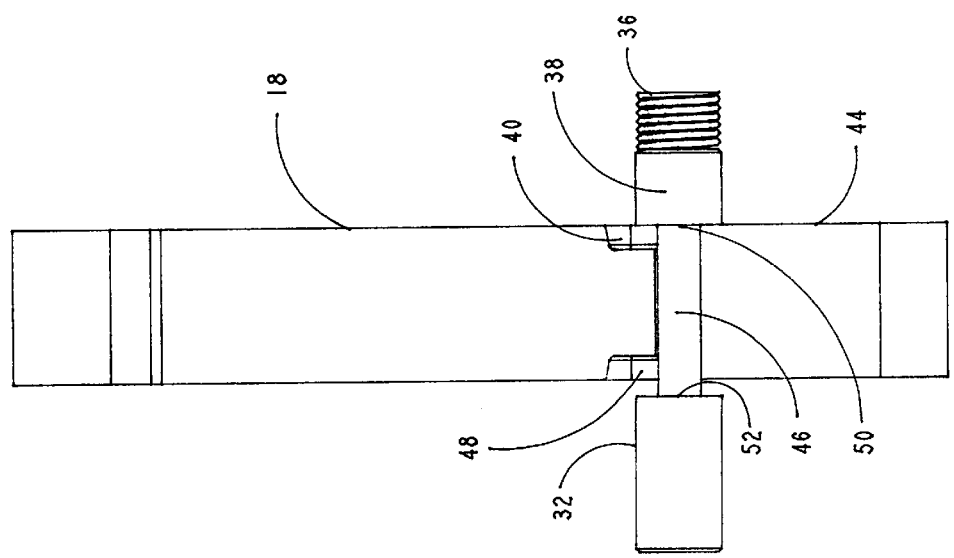

LOCKING CAM-TYPE COUPLING

BACKGROUND OF THE INVENTION

This invention is directed to a locking cam-type coupling for rapidly coupling two pipe sections together. A spring-biased lock pin is provided for each cam lever arm that has a positive locking action when the cam lever arm is moved to the closed position. Each cam lever arm is grooved to allow the spring-biased lock pin to contact the cam lever arm and control its position. The lock pin has two different diameters, one for locking the fitting to the complementary part of the pipe coupling to couple the pipe sections together, and a second, open position so the pipe sections can be released and decoupled.

1. Discussion of Related Art

U.S. Pat. No. 4,222,593 issued Sep. 16, 1980 to Lauffenburger relates to a coupling having a safety locking device. A male and a female coupling member are adapted to be coupled together and held in place by a pair of pivotal coupling arms.

The arms are mounted on the female half of the coupling, and each includes a cam portion which is engageable in a groove in the male coupling member. The pivotal coupling arms compress a sealing member between the male and female couplings when they are closed against the female coupling.

Each coupling arm is further provided with a safety locking device mounted on the female coupling member, which comprises a reciprocally mounted locking pin, a spring for biasing the locking pin to a locking position overlying the coupling lever, and a manual lever member which engages the locking pin, and which pivots to retract the locking pin to a lock-release position. Locking and unlocking requires manual operation of the locking member. It is possible to operate the locking pin independently of the coupling arm, and if the locking pin is in the locked position when the coupling arm is not closed, the locking pin must be manually operated before the coupling arm can be closed.

U.S. Pat. No. 5,042,849 issued Aug. 27, 1991 to Kersting shows a coupling for a flexible hose which incorporates a pair of locking arms similar to those shown in the Lauffenburger patent. However, positive locking means for the cam locking arms is not shown.

U.S. Pat. No. 5,042,850 issued Aug. 27, 1991 to Culler, shows a safety latch cam and groove-type quick disconnect coupling which allows the pressurized fluid line to bleed down to a safer pressure before being fully disconnected. The cam-locking arms do not appear to have locking pins.

Although the Lauffenburger patent shows a safety locking device for coupling lever arms, the locking device comprises a complex mechanism which includes a lock pin 56 operated by a spring-biased latching lever 16. The lock pin 56 has an abutment shoulder to limit its forward motion. It is necessary for the lock pin 56 to disengage the latching lever 16 completely so that latching lever 16 can be pivoted to its coupling disconnect position.

SUMMARY OF THE INVENTION

Most rapid-disconnect cam type couplings are subjected to rugged conditions of service in an environment where accidental decoupling can pose a serious safety hazard. The rapid disconnect arms may catch on stationary objects as the fluid conduit system is moved across the ground in the workplace. If the fluid spilled by an accidental decoupling is an acid or other dangerous chemical, the consequent hazards to personnel and environment are clear. It is, therefore, very important that a positive, easy-to-use, locking mechanism is employed which can stand the rugged service, and not give up the important advantages of the rapid-disconnect cam-type coupling.

This invention is directed to a cam-type coupling in which the cam lever arms are grooved near their respective pivots to accommodate a spring-biased, lock pin having two different diameters. As the cam lever arm is pivoted to the closed position, its grooved cam surface automatically releases the spring-biased lock pin to the locked position with an audible click. The lock pin is positively seated so that the lever arm remains positively locked, even under the roughest conditions of field service.

In order to release the coupling, it is necessary to depress the lock pin manually, while simultaneously pivoting the cam lever out of the locked position. Once the cam lever arm is out of the locked position, the large diameter portion of the lock pin is held in place by the surface of the cam, and will remain in this position due to the force of the compressed spring of the lock pin until the cam lever arm is again manually moved to the closed position.

The simplicity of the positive locking mechanism, in which the locking cam surfaces are integrally formed in the cam lever arms, and interact with a lock pin of simple construction to positively lock the cam lever arms in the closed position is believed to offer a substantial advantage over prior locking mechanisms. This invention provides a rugged pipe coupling which is very well adapted to efficient and safe handling of corrosive chemicals and other fluids.

BRIEF DESCRIPTION OF THE DRAWINGS

FIG. 2 is similar to FIG. 1 with the parts joined, and showing one cam lever arm in the open position, and one in the closed, locked position;

FIG. 3 is a transverse section taken on line 3—3 of FIG. 2 showing the respective positions of the lock pins corresponding to the cam lever arm positions shown in FIG. 2;

FIG. 6 is a frontal view of the cam lever arm and lock pin shown in FIG. 4; and

FIG. 7 is a frontal view of the cam lever arm and lock pin shown in FIG. 5.

DETAILED DESCRIPTION OF THE INVENTION

Figure 1:
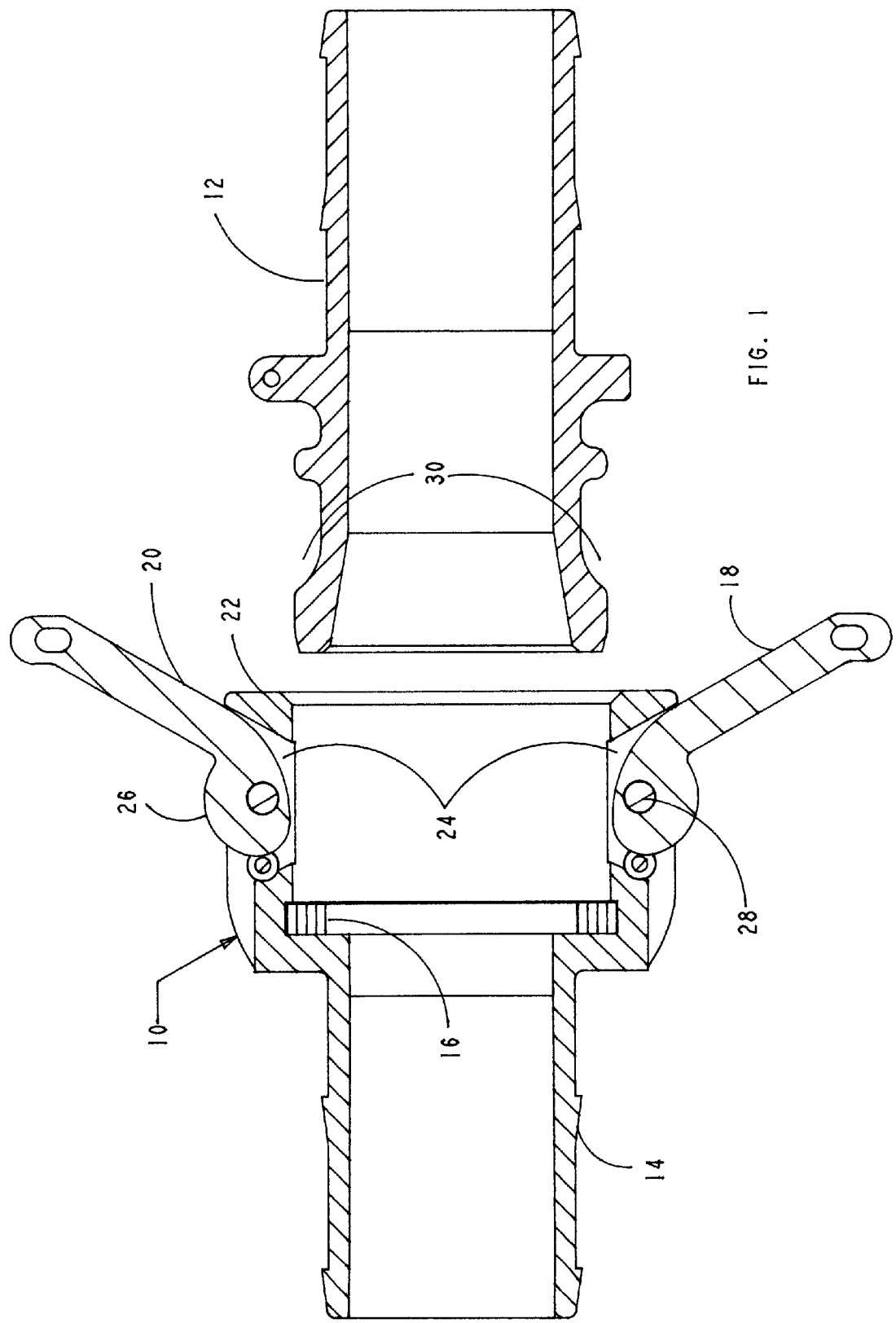
FIG. 1 is a longitudinal sectional view of the two parts of the locking cam-type coupling of the invention ready for joining.
Figure 5:
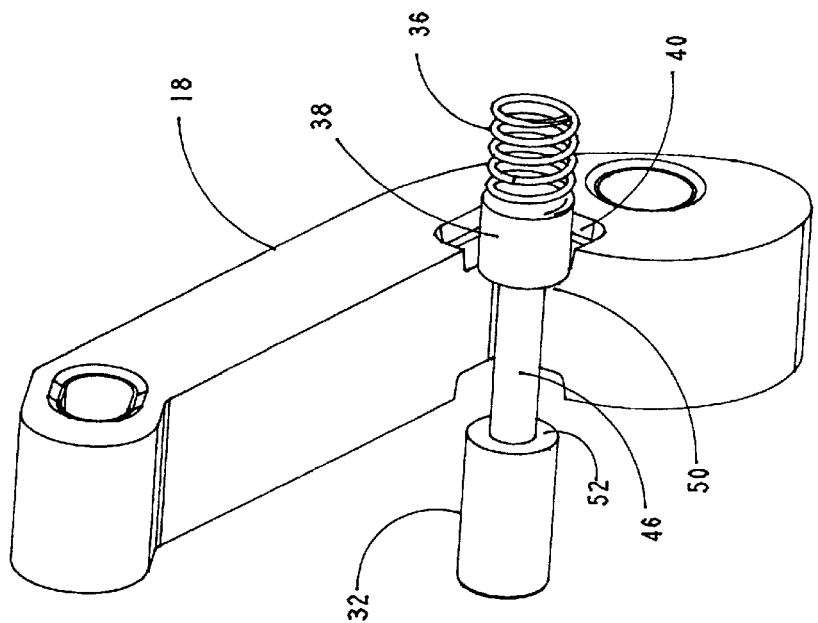
FIG. 5 is similar to FIG. 4, but showing the lower cam lever arm and lock pin in the closed, locked position.

As shown in the drawings, a rapid-disconnect pipe coupling 10 comprises a male coupling member 12, and a complementary female coupling member 14. A sealing gasket member 16 is disposed between the male and female coupling members 12 and 14, respectively. A pair of cam lever arms 18 and 20 are pivotally mounted opposite each other near outer end 22 of the female coupling member 14, in recesses 24. The cam lever arms 18 and 20 each have an enlarged inner end 26, and are pivotally connected to the female coupling member 14 by means of pivot pins 28.

The male coupling member 12 is provided with an external recess 30, into which the corresponding enlarged inner ends 26 of the cam lever arms 18 and 20 fit snugly when the cam lever arm 18 or 20 is in the locked position, as shown in FIG. 2.

FIGS. 3–7 shows the respective open and locked positions of lock pins 32 and 34. As shown in FIGS. 3–7, when the cam lever arm 18 is in the locked position, lock pin spring 36 is fully expanded and small end 38 of lock pin 32; is urged into locking engagement with the corresponding cam surface 40 to firmly lock the cam lever arm 18 into the locked position.

As can also be seen in FIGS. 3–7, cam lever arm 20 is shown in the open position, with large end 42 of the lock pin 34 urged against opposite grooved surface 44 of the cam lever arm 20 by the elevation of the cam surface 40 acting on the small end 38 of the lock pin 34, compressing lock pin spring 36, so that cam lever arm 20 is held in the open position until it is manually moved again to the closed position. When the cam lever arms 18 and 20 are moved to their closed positions, there is a corresponding audible click sound, which insures the operator that there is a positive locking engagement of the coupling, and that it is safe to pass corrosive fluids through the pipe coupling 10.

The deceptively simple construction of the cam lever arm locking mechanism can best be seen in FIGS. 4–7. FIGS. 4–7 are enlarged views of the cam lever arm 18 in the open (FIGS. 4 & 6) position, and the locked (FIGS. 5 & 7) positions. FIGS. 4–7 show how middle narrower portion 46 of the lock pin 32 nests in transverse, hemi-circular groove 48 of the cam lever arm 18 (or 20),when the cam lever arm 18 is in the locked position.

Inner, annular surfaces 50 of the small ends 38 of the lock pin 32 contact the respective, corresponding cam surface 40 to position the lock pin 32 to positively lock the cam lever arm 18. A positive, manual force is required to unlock the cam lever arm 18 (or 20) from the locked position.

The only time that the cam lever arm locking mechanism can be locked is when the cam lever arms 18 and 20 are in the locked position because the cam surfaces 40 and 44 are integrally formed in the cam lever arms 18 and 20. Thus, when the cam lever arms 18 and 20 are in the closed position, the systems operator is always assured the coupling 10 is locked.

Figure 4:
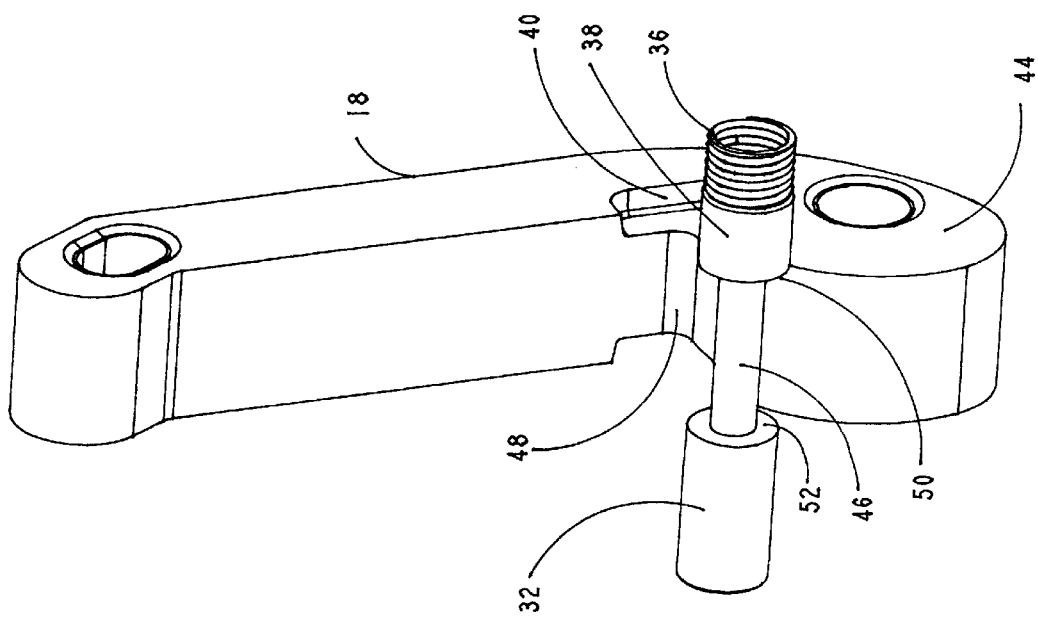
FIG. 4 is an enlarged perspective view of the lower closed cam lever arm and lock pin shown in FIG. 2, viewed from the underside of FIG. 2, and showing the cam lever arm in the open, unlocked position.

FIGS. 4 and 6 show the relationship of the lock pin 32 to the lock pin spring 36 and the cam lever arm 18 when the cam lever arm 18 is in the open position. Cam surface 50 of the large end 38 of lock pin 32 rides up on cam surface 44 of the cam lever arm 20 and the coupling 10 can be decoupled, or coupled when both lever arms (18 & 20) are in this position.

This invention provides a rapid disconnect, cam-type pipe coupling with a positive locking action, especially suited for safe handling of corrosive chemical fluids. The systems operator is assured of a good, sealed fit when joining the coupling when he hears an audible "click" when the lock pins fall into place in the hemi-circular grooves of their respective lever arms as the lever arms are closed.

What is claimed is:

1. A rapid-disconnect, locking cam-type coupling which includes a tubular male member having cam receiving recesses in an outer surface thereof, and a tubular female member having pivotal lever arms which have enlarged cam shoulders having side surfaces, said cam shoulders being adapted to be disposed in the cam receiving recesses on the outer surface of the tubular male member when the pivotal lever arms are in a closed position in contact with the tubular male member, the improvement comprising:

a cam-actuated lock means having an unlocked position when the lever arm is in an open position and a locked position when the lever arm is in the closed position, said lock means including:

a cam surface integrally formed on the side surface of the enlarged cam shoulder of each lever arm for holding the lock means in the open position at all times when the corresponding lever arm is pivoted away from the pipe coupling and automatically actuating the lock means to close to the locked position when the lever arm is pivoted against the pipe coupling, said cam surface including a recessed pocket formed in the side of each cam shoulder of each lever arm, and a spring biased, spool-shaped lock pin disposed adjacent each pivotal lever arm, said lock pin being of unitary construction and having a cylindrical first end portion having a diameter and an annular inner surface and a cylindrical second end portion having a diameter and an annular inner surface, said end portions being interconnected by a central middle portion having a diameter smaller than the diameter of the first end portion and smaller than the diameter of the second end portion;

said recessed-pocket lockingly engaging the annular inner surface of the second end portion of the spring-biased, spool-shaped lock pin to positively lock said lever arm in the locked position against the pipe coupling when the lever arm is pivoted to the closed position.

2. The rapid-disconnect, locking cam-type pipe coupling of claim 1, in which the cam surface is integrally formed in the side surfaces of the lever arms for contacting the inner annular surface of the second end portion of said lock pin to move the lock pin to the locked position when the lever arm is in the closed position, and to move the lock pin to the unlocked position when the lever arm is in the open position, said lock pin being continuously engaged with the corresponding cam surface of the lever arm.

3. The rapid-disconnect, locking cam-type pipe coupling of claim 2, including housing means formed in the outer surface of the tubular female member for pivotally receiving the lever arms and substantially enclosing the inner annular surface of the second end portion of the lock pins.

4. The rapid-disconnect, locking cam-type pipe coupling of claim 3, including a coil spring coaxially disposed against the lock pin in the housing means to bias the annular inner surface of the second end portion of the lock pin against the integrally formed cam surface of the corresponding lever arm.

* * * * *